3,084,163
HETEROCYCLIC THIOALKANE SULFONIC ACIDS AND METHODS FOR THEIR PRODUCTION
Wolf-Dieter Willmund, Dusseldorf-Holthausen, and Alfred Kirstahler, Dusseldorf, Germany, assignors to Dehydag, Deutsche Hydrierwerke G.m.b.H., Dusseldorf, Germany, a corporation of Germany
No Drawing. Filed Apr. 29, 1958, Ser. No. 731,603
6 Claims. (Cl. 260—248)

This invention relates to sulfoalkylated heretocyclic compounds containing nitrogen heteroatoms and methods for producing them.

We have found that valuable new heterocyclic compounds which are substituted in the nucleus by —S-alkanesulfonic acid radicals or substituted —S-alkane-sulfonic acid radicals are obtained if either heterocyclic compounds which contain at least two

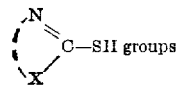

within the heterocyclic molecule are reacted with sulfoalkylating agent, or if heterocyclic compounds which contain at least two

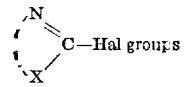

within the heterocyclic molecule are reacted with mercaptoalkane-sulfonic acids. In the indicated formulas, X represents a carbon, sulfur or nitrogen atom and Hal represents an exchangeable halogen atom.

These new heteraocyclic compounds substituted in the nucleus by —S-alkane-sulfonic acid radicals or substituted —S-alkane-sulfonic acid radicals have the general formula $$R(S—R_1—SO_3H)n$$

wherein R is a heterocyclic nucleus having at least two

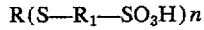
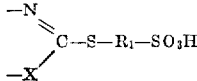

groups and X represents a carbon, sulfur or nitrogen atom, said heterocyclic nucleus containing preferably 5 or 6 atoms in the ring, $n$ is an integer greater than one and preferably 2 or 3 and $R_1$ is a bivalent organic radical and preferably a lower alkylene radical, a lower hydroxyalkylene radical or a lower chloro-alkylene radical. These new heterocyclic thio alkane sulfonic acid derivatives are obtained in the form of the free acid, or the ammonium or alkali metal salts thereof.

As heterocyclic starting compounds for the process according to the invention, primarily 5- and 6-membered ring systems are suitable, such as: 2,5-dimercapto-1,3,4-thiadiazole, 3,5-dimercapto-1,2,4-thiadiazole, 2,5-dichloro-1,3,4-thiadiazole, 3,5-dichloro-1,2,4-thiadiazole, 2,5-dimercapto - 1,3,4 - triazole, 2,4-dimercapto-1,3,5-triazine, 2,4,6-trimercapto - 1,3,5 - triazine (trithiocyanuric acid), 2,4-dichloro-1,3,5-triazine, 2,4,6-trichloro - 1,3,5 - triazine (cyanuric chloride), 2,4,6-tribromo-1,3,5-triazine, 3,6-dichloropyridazine, and the like.

The term "sulfoalkylating agents" includes those which enable the introduction on the heterocyclic nucleus through a thio-ether linkage of an alkyl chain with a terminal sulfonic acid group; the alkyl chain may also carry other substituents, such as chloro, hydroxy or phenyl radicals. Suitable sulfoalkylating agents are primarily halo-alkane-sulfonic acids or their salts, sultones, or mixtures of alkylene-bis-halides and sodium sulfite.

Suitable halo-alkane-sulfonic acids are, for example, the following: bromomethane-sulfonic acid, 2-bromoethane - sulfonic acid-1, 3-bromopropane-sulfonic acid-1, 2-bromopropane-sulfonic acid-1, 3-chloro-2-hydroxypropane-sulfonic acid-1, 4-bromobutane-sulfonic acid-1, 6-bromo-hexane-sulfonic acid-1, 4-chloromethylbenzenesulfonic acid-1, and the like.

Suitable sulfones are, for example: propane sultone, 1,4-butane sultone, technical mixtures of 1,3- and 1,4-butane sultone, isopentane sultone, and other sultones of aliphatic hydrocarbon chains, which may also contain branched chain or substituted hydrocarbon chains. Furthermore, sultones in which carbon atoms of a cycloaliphatic or aromatic ring are components of the sultone ring, such as tolyl sultone, 1,8-naphthyl sultone, and the like, may be used for the reaction.

Suitable alkylene-bis-halides which, in admixture with sodium sulfite, are useful as sulfoalkylating agents are, for example, methylene bromide, 1,1-dibromoethane, 1,2-dichloroethane, 1,3-dibromopropane, 1,2-dichloropropane, 1,4-dibromobutane, 1,3-dibromobutane, 2,3-dibromobutane, and the like.

If heterocyclic compounds containing an exchangeable halogen atom are used as starting components, the introduction of an —S-alkane-sulfonic acid radical is accomplished with the aid of mercaptoalkane-sulfonic acids, such as 2-mercaptoethane-sulfonic acid-1, 3-mercaptopropane-sulfonic acid-1, 4-mercapto-n-butane-sulfonic acid-2, 3-mercapto-n-butane-sulfonic acid-1, or with salts thereof.

The reaction of the heterocyclic starting compounds of the type described above, containing mercapto groups, with suitable sulfoalkylating agents is advantageously carried out in alkaline solution or suspension. Depending upon the solubility of the two reactants, aqueous, aqueous-alcoholic or purely alcoholic solutions, or solutions in other organic solvents, may be used.

In the case of sulfoalkylation with halo-alkane-sulfonic acids, a solution of the latter is added dropwise or in a slow stream at room temperature, accompanied by stirring, to a solution of the mercaptan salt of the heterocyclic starting compound. An increase in the temperature of about 10 to 20° C. indicates the beginning of the reaction, which can be brought to completion by gradually warming the reaction mixture up to the boiling point of the solvent. Conversely, it is also possible to provide a solution or suspension of the halo-alkane sulfonates and to add thereto a solution of the heterocyclic mercapto compound or its salts.

When the sultones are used, the sulfoalkylation is advantageously carried out in aqueous-alcoholic solution by slowly adding an alcoholic sultone solution at elevated temperatures to an aqueous alkaline solution of the heterocyclic starting compound containing mercapto groups, and, upon termination of the inherent temperature increase, heating the reaction mixture to the boiling point of the solvent. In this case the reaction product separates out in substantially pure form upon cooling.

If the sulfoalkylation is carried out with alkylene-bis-halides, it is recommended that an excess of the halogen compound be used as the reaction medium or solvent, and the reaction of the alkylene-bis-halide, on the one hand, with a heterocyclic mercaptide compound and, on the other hand, with sodium sulfite, be carried out simultaneously or one after the other. It is, however, also possible to carry out the reaction in an aqueous-alcoholic solution.

In similar simple fashion, heterocyclic-thio-alkane-sulfonates of the above-described type may also be produced by reacting mercaptoalkane-sulfonic acids or their salts with heterocyclic starting materials which contain at least two exchangeable halogen atoms. In this case the reaction is performed, for example, by admixing an aqueous suspension of the heterocyclic compound gradually with a solution of a mercaptoalkane sulfonate and the equivalent amount of sodium carbonate accompanied by stirring, and then slowly increasing the reaction temperature to about 80° C. After all of the aqueous suspension has been added, the reaction mixture is heated for a short period of time to the boiling point, and the reaction product is precipitated from the aqueous solution by addition of methanol.

The reaction products thus obtained are powdery, non-meltable heterocyclic thio-alkane sulfonic acids. They are useful as corrosion inhibitors, as rubber additives and as fungicides in pest control.

The following examples will further illustrate the present invention and enable others skilled in the art to understand it more completely. It will be understood, however, that the invention is not limited to these particular examples.

*Example I*

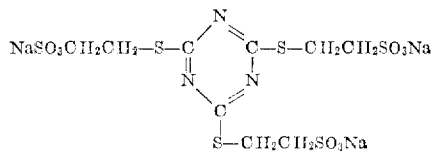

65 gm. of bromoethane sodium sulfonate were dissolved in water and the solution was admixed at room temperature with a solution of 35.2 gm. of trisodiumtrithiocyanurate (about 70%) in 75 cc. of water to which 10 gm. of 25% sodium hydroxide solution had been added; the temperature rose about 5 to 10°. After termination of the temperature increase, the reaction mixture was heated within a period of 20 minutes to the boiling point, and was thereafter refluxed for one hour while stirring. From the cooled solution the trisodium salt of s-triazine-2,4,6-tris-(2'-mercaptoethane-1'-sulfonic acid) was precipitated by the addition of methanol. 45 gm. of a colorless, non-meltable powder were obtained in this manner, which represents about 80% of the theoretical yield.

*Example II*

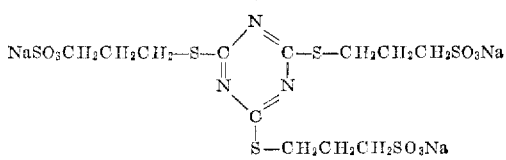

A solution of 75 gm. of propane sultone in 200 gm. of ethanol, heated to about 50° C., was added over a period of 30 minutes to a solution of 70.4 gm. of trisodiumtrithiocyanurate (about 70%) in a mixture of 150 gm. of water and 200 gm. of ethanol at 50° C. The temperature rose to about 70° C. Toward the end of this period the reaction product began to separate out. The reaction mixture was then heated to the boiling point, the solution which had become acid was neutralized with 70 gm. of a 25% sodium hydroxide solution, and the neutralized reaction mixture was refluxed for 10 minutes while stirring. Thereafter, the reaction mixture was allowed to stand for 12 hours in a refrigerator, whereupon the solid product which had separated out was filtered off on a suction filter, washed with alcohol and dried. 62.6 gm. of a colorless, loose powder were obtained, which consisted of the trisodium salt of s-triazine-2,4,6-tris-(3'-mercaptopropane - 1' - sulfonic acid). The yield was 64% of theory.

*Example III*

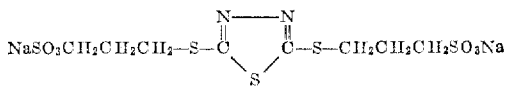

An aqueous-alcoholic solution of the sodium salt formed by 33.5 gm. of 2,5-dimercapto-1,3,4-thiadiazole and 18 gm. of caustic soda was admixed over a period of 30 minutes at 50° C. with a solution of 54.5 gm. of propane sultone in 50 cc. of ethanol, accompanied by stirring, and the resulting mixture was heated to the boiling point and refluxed for 10 minutes while continuing to stir. The resulting solution was filtered and the clear filtrate was evaporated. The residue was dissolved in water, the aqueous solution was extracted with ether and again evaporated to dryness. 96.6 gm. of the disodium salt of 1,3,4-thiadiazole-2,5-bis-(3'-mercaptopropane-1'-sulfonic acid) were obtained as a colorless and odorless powder. The yield was 99% of theory.

*Example IV*

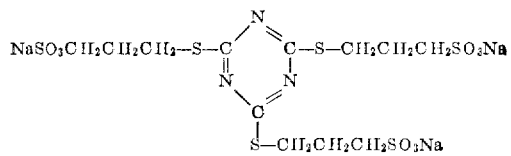

A suspension of 18.5 gm. of cyanuric chloride in 50 cc. of water was admixed over a period of one-half hour with a solution of 53.4 gm. of 3-mercaptopropane-sodium sulfonate-1 and 15.9 gm. of sodium carbonate (anhydrous) in 113 cc. of water, whereby the temperature increased from room temperature to about 70° C. Thereafter, the reaction mixture was heated to the boiling point and refluxed for 2 hours while stirring. The clear, weakly yellowish-green solution contained 25% by weight of the trisodium salt of s-triazine-2,4,6-tris-(3'-mercaptopropane-1'-sulfonic acid). It was precipitated from the solution by adding methanol thereto. From 100 gm. of solution, 22.6 gm. of a nearly white unmeltable powder, which was slightly soluble in water, were thus obtained. The yield was 90% of theory.

*Example V*

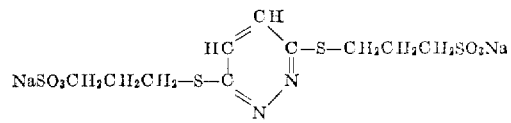

A suspension of 14.9 gm. of 3,6-dichloropyridazine in 50 cc. of water was admixed in the course of one-half hour with a solution of 40 gm. of 3-mercaptopropane-sodium sulfonate-1 and 11.1 gm. of anhydrous sodium carbonate in 75 cc. of water, with vigorous stirring, whereby the temperature rose to about 50° C. The mixture was stirred for an additional 30 minutes at this temperature and was thereafter heated to the boiling point within a period of 30 minutes, whereupon it was refluxed for 2 hours while stirring. The clear yellowish solution contained the disodium salt of pyridazine-3,6-bis-(3'-mercaptopropane-1'-sulfonic acid) which was precipitated by adding twice the amount by volume of acetone, and the precipitate was separated. A yellowish powder was obtained. The yield was about 75% of theory.

In like manner the following compounds were also produced.

The trisodium salt of 1,3,5-triazine-2,4,6-tris-(3'-mercapto propane-2'-hydroxy-1'-sulfonic acid) having the structural formula:

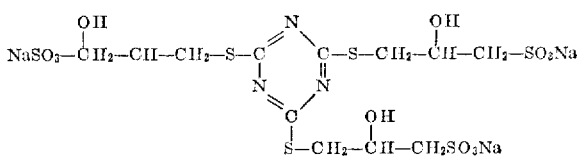

The triammonium salt of 1,3,5-triazine-2,4,6-tris-(3'-mercaptopropane-2'-hydroxy-1'-sulfonic acid) having the structural formula

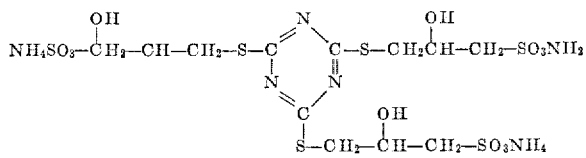

The disodium salt of 1,3,4-triazole-2,5-bis-(3'-mercaptopropane-2'-hydroxy-1'-sulfonic acid) having the structural formula

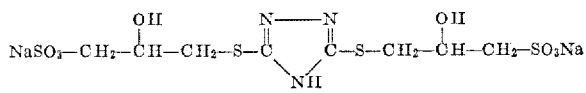

The disodium salt of 1,3,4-triazole-2,5-bis-(3'-mercaptopropane-1'-sulfonic acid) having the structural formula

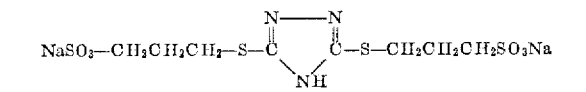

This application is a continuation-in-part of copending application, Serial No. 618,183, filed October 25, 1956, in the name of Kirstahler, Strauss, and Willmund now U.S. Patent 2,849,352, issued August 26, 1958. This patent discloses use of the heterocyclic thioalkane sulfonic acids having the formula $R(S—R_1—SO_3H)_n$ as brightening additives in electroplating baths.

While we have disclosed various specific embodiments of our invention, it will be apparent to persons skilled in the art that the present invention is not limited to these specific embodimens and that various changes and modifications may be made without departing from the spirit of the invention or the scope of the appended claims.

We claim:
1. The trisodium salt of sym-triazine-2,4,6-tris-(2'-mercaptoethane-1'-sulfonic acid).
2. The trisodium salt of sym-triazine-2,4,6-tris-(3'-mercaptopropane-1'-sulfonic acid).
3. The trisodium salt of sym-triazine-2,4,6-tris-(3'-mercaptopropane-2'-hydroxy-1'-sulfonic acid).
4. The triammonium salt of sym-triazine-2,4,6-tris-(3'-mercaptopropane-2'-hydroxy-1'-sulfonic acid).
5. A compound selected from the group consisting of
(A) Those compounds of the formula:

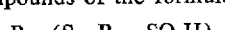

wherein R is an s-triazine group and $R_1$ is a bivalent radical selected from the group consisting of lower alkylene, lower hydroxy-alkylene and lower chloro-alkylene, and
(B) the ammonium salt thereof and
(C) the alkali metal salts thereof.
6. A process for the production of an s-triazine-tri-thioalkane sulfonic acid which comprises the steps of reacting, at a temperature between room temperature and about 80° C., an excess of a mercapto sulfonic acid having the formula:

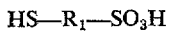

wherein $R_1$ is a bivalent radical selected from the group consisting of lower alkylene, lower hydroxy-alkylene and lower chloro-alkylene, in solution with sodium carbonate, with cyanuric halide, and recovering the s-triazine-tri-thioalkane sulfonic acid produced.

References Cited in the file of this patent
UNITED STATES PATENTS

| | | |
|---|---|---|
| 2,298,533 | Hentrich et al. | Oct. 13, 1942 |
| 2,394,306 | Hentrich et al. | Feb. 5, 1946 |
| 2,536,849 | Kaiser et al. | Jan. 2, 1951 |
| 2,603,646 | Mathes | July 15, 1952 |
| 2,673,203 | Stegel | Mar. 23, 1954 |
| 2,677,686 | Smith et al. | May 4, 1954 |
| 2,685,588 | Goshorn et al. | Aug. 3, 1954 |
| 2,719,849 | Ainsworth et al. | Oct. 4, 1955 |
| 2,723,275 | Kaiser et al. | Nov. 8, 1955 |
| 2,742,466 | Randall et al. | Apr. 17, 1956 |
| 2,801,244 | Balon | July 30, 1957 |
| 2,822,366 | Haas et al. | Feb. 4, 1958 |
| 2,849,351 | Gundel et al. | Aug. 26, 1958 |
| 2,849,352 | Kirstahler et al. | Aug. 26, 1958 |

FOREIGN PATENTS

| | | |
|---|---|---|
| 192,920 | Austria | Nov. 11, 1957 |
| 823,447 | Germany | Dec. 3, 1951 |
| 500,032 | Great Britain | Jan. 27, 1939 |
| 764,340 | Great Britain | Dec. 28, 1956 |

OTHER REFERENCES

Henne et al.: Journ. of the Am. Chem. Soc., volume 58, page 882 (1936).

Beilstein's Handbuch der Organischen Chemie, 4th edition, volume 26, page 128 (abstract of Heintz, A. 136, 229 and Klason B. 14, 733) (1937).

Simmons: Ind. and Eng. Chem., volume 39, No. 3, page 238 (1947).

Smolin et al.: The Chemistry of Heterocyclic Compounds, pages 114 to 115; Interscience Publishers Inc., New York (1959).

UNITED STATES PATENT OFFICE
CERTIFICATE OF CORRECTION

Patent No. 3,084,163                                              April 2, 1963

Wolf-Dieter Willmund et al.

It is hereby certified that error appears in the above numbered patent requiring correction and that the said Letters Patent should read as corrected below.

Column 2, line 7, for "sulfones" read -- sultones --; column 3, line 64, for "dride" read -- dried --; column 5, lines 3 to 9, the upper right-hand portion of the formula should appear as shown below instead of as in the patent:

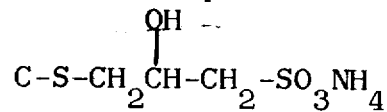

Signed and sealed this 12th day of November 1963.

(SEAL)
Attest:

ERNEST W. SWIDER                                        EDWIN L. REYNOLDS

Attesting Officer                                      Acting Commissioner of Patents